United States Patent [19]

Cordell, Jr.

[11] 4,074,454
[45] Feb. 21, 1978

[54] FISHING LURE

[76] Inventor: Carl R. Cordell, Jr., P.O. Box 2020, Hot Springs, Ark. 71901

[21] Appl. No.: 744,099

[22] Filed: Nov. 22, 1976

[51] Int. Cl.² .............................................. A01K 85/00
[52] U.S. Cl. ................................. 43/42.28; 43/42.29
[58] Field of Search .................. 43/42.28, 42.29, 42.24

[56] References Cited

U.S. PATENT DOCUMENTS

| 3,343,296 | 9/1967 | Davis | 43/42.28 |
| 3,590,514 | 7/1971 | Begley | 43/42.29 X |
| 3,861,073 | 1/1975 | Thomassin | 43/42.24 X |

Primary Examiner—Russell R. Kinney
Assistant Examiner—Daniel J. Leach
Attorney, Agent, or Firm—Berman, Aisenberg & Platt

[57] ABSTRACT

The combination of a plastic multi-strand skirt with a curled tail made out of a substantially flat thin plastic. The strands of the skirt extend from a collar portion which may be wrapped about a tubular support member such that the skirt members trail along a first direction therefrom. The flat curled tail member may be mounted on the collar of the skirt in any of three different constructions. In one preferred embodiment, the curled tail member extends from the collar of the skirt in a direction opposite to the direction of extension of the strands of the skirt. In an alternative embodiment, the curled tail extends rearwardly along with the strands of the skirt so as to be intermingled therewith. In a still alternative embodiment, a pair of curled tails extend both forwardly and rearwardly of the collar of the skirt.

23 Claims, 9 Drawing Figures

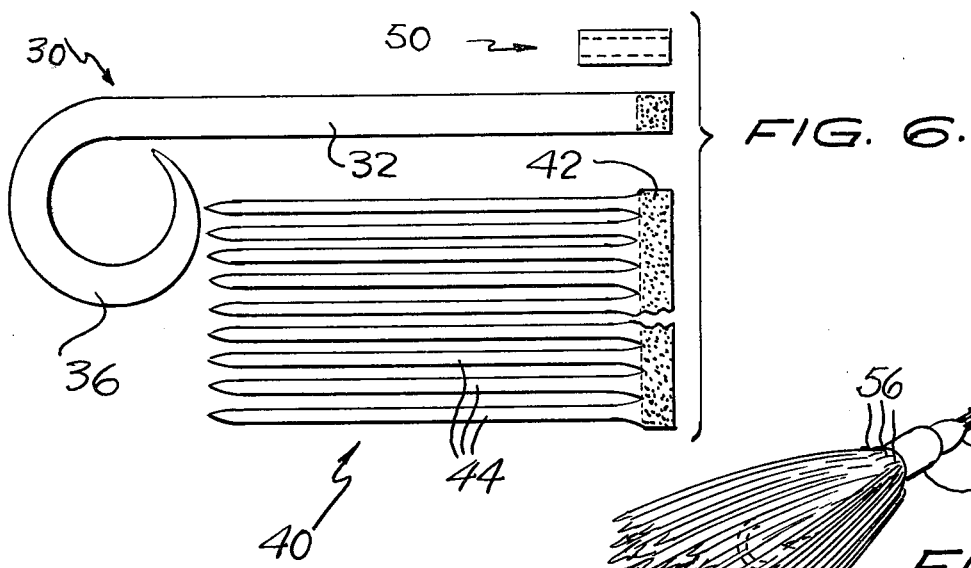
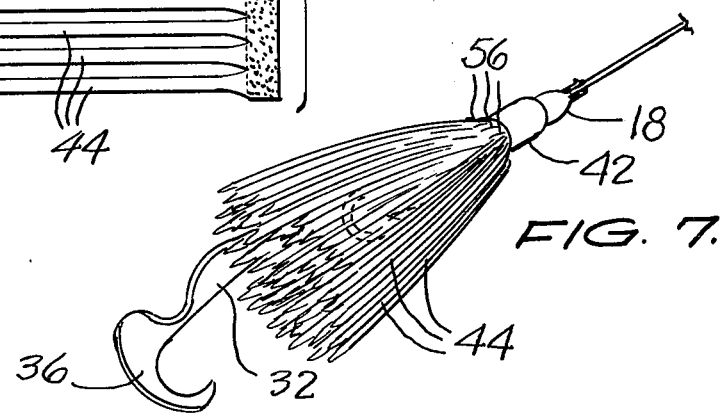
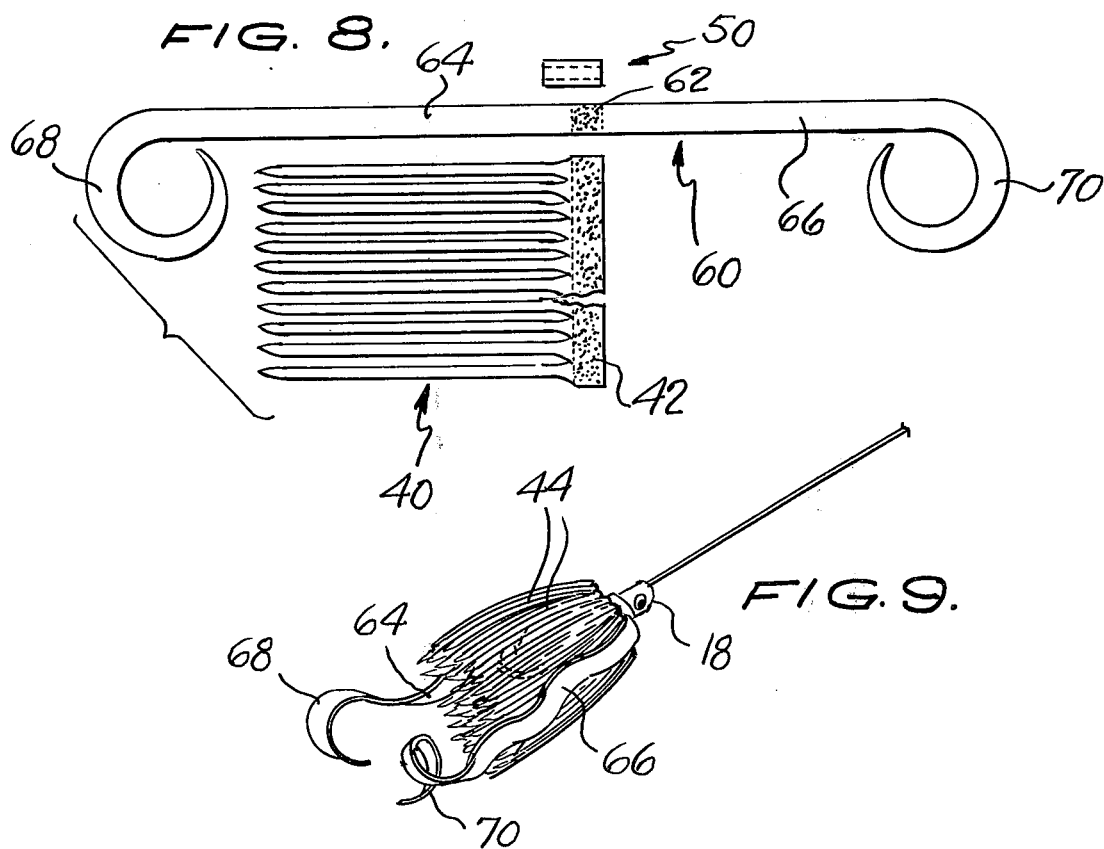

4,074,454

FISHING LURE

BACKGROUND OF THE INVENTION

1. Field of the Invention

The present invention is related to fishing lures and, more particularly, is directed toward a novel and unique artificial fishing lure which is comprised of two basic members, each formed of a thin flexible plastic or the like.

2. Description of the Prior Art

There are presently marketed a wide variety of artificial fishing lures, each of which is designed with a view towards providing the greatest possible amount of life-like action in order to enhance the fish-attracting capabilities of the lure.

One of the better known designs of an artificial fishing lure is exemplified by the structure described in U.S. Pat. No. 2,268,541 to Arbogast in which he teaches a skirt-like member which may be wrapped about the shank of a fish hook and which has a plurality of individual strands or skirt members extending rearwardly therefrom.

Another example of an artificial fishing lure is set forth in the Lee Pat. No. 3,959,912, in which the inventor essentially describes a skirt-like structure in which the essentially straight individual strands of the Arbogast skirt have been replaced by strands having consecutive thick and thin portions and which terminate in curled tail portions. The material utilized by Lee for his lure is described as a soft, highly pliable elastomeric plastic which, unfortunately, tends to tear apart after prolonged use, and must therefore be replaced at frequent intervals.

Other artificial lures are also detrimentally prone to wearing out prematurely. In fact, some of them must even be maintained in a preservative solution between uses in order to prevent total disintegration.

Other United States patents in the same general art area of which I am aware which describe other typical, yet not widely adopted, artificial lures include: 1,851,529; 1,910,742; 2,502,979; 3,343,296; 3,564,754; 3,590,514; and 3,803,747.

OBJECTS AND SUMMARY OF THE INVENTION

It is therefore a primary object of the present invention to provide a new and improved artificial fishing lure which overcomes all of the disadvantages noted above with respect to prior art structures.

Another object of the present invention is to provide a novel and unique artificial fishing lure which is comprised of a thin, flexible plastic that renders the structure highly durable and reusable.

An additional object of the present invention is to provide a novel and unique artificial fishing lure which provides a high degree of fish-attracting capability heretofore unrealized.

A still further object of the present invention is to provide an effective and life-like artificial fishing lure which may be marketed economically, utilized repeatedly without wearing out, and which provides performance superior to the prior art lures presently available.

The foregoing and other objects are attained in accordance with one aspect of the present invention through the provision of a lure which may be attached to a fish hook shank, which comprises skirt means having a plurality of skirt members extending therefrom, and curled tail means connected to the skirt means. The curled tail means comprises a thin piece of flexible material having substantially planar parallel flat surfaces. In a best mode, the flexible material preferably comprises latex rubber, rubberized vinyl, or the like, ranging in thickness between approximately 0.004 and 0.020 inches.

More particularly, the flexible material utilized as the curled tail means comprises an elongated body portion and a curvilinear tail portion which extends integrally from one end thereof. In one embodiment, the distal end of the elongated body portion is connected to the skirt means. The skirt means may include a collar from which the plurality of skirt members integrally extend, the distal end of the elongated body portion being connected to the collar. The skirt itself may be comprised also of thin flexible material belonging to the same family as the curled tail member, and having a thickness on the same order.

In accordance with one embodiment of the present invention, the elongated body portion of the curled tail means extends from its point of connection to the skirt means in a direction substantially opposite to the direction of extension of the plurality of skirt members. In an alternative embodiment, the elongated body of the curled tail means extends from its point of connection to the skirt means in substantially the same direction at that of the extension of the skirt members.

In yet another and alternative embodiment of the present invention, the elongated body portion of the flexible material further comprises a second curvilinear tail portion which extends integrally from its distal end. A midpoint of the elongated body member is connected to the collar of the skirt means so as to define a pair of elongated body portions that extend in opposite directions from the collar. The collar of the skirt means is preferably wrapped about itself to form a plurality of concentric layers such that the individual strands or skirt members extend in a concentric fashion from one end thereof. The distal end of the elongated body portion of the curled tail member is placed preferably between successive layers of the wrapped collar and may be held in place by a suitable adhesive. A tubular member may also be provided about which the collar of the skirt means may be wrapped for further support.

The above-described embodiments may be mounted on a fish hook in several different configurations. One configuration has the skirt members surrounding a portion of the elongated body of the curled tail means, while another configuration has the elongated body portion of the curled tail means falling outside the plurality of skirt members so as to trail alongside same in use. The double-tailed embodiment may be mounted on the fish hook shank such that part of the first elongated body portion may be positioned within the skirt members, while the second elongated body portion may be positioned outside of the plurality of skirt members so as to trail alongside same in use.

BRIEF DESCRIPTION OF THE DRAWINGS

Various objects, features and attendant advantages of the present invention will be more fully appreciated as the same become better understood from the following detailed description thereof when considered in connection with the accompanying drawings, in which:

FIG. 6 is an exploded plan view, with parts broken away, which illustrates the basic components which may be utilized to construct a second and alternative embodiment of the present invention;

FIG. 7 is a perspective view of a constructed and mounted version of the second embodiment illustrated in FIG. 6;

FIG. 8 is an exploded plan view, with parts broken away, which illustrates the basic components that may comprise a third and alternative embodiment of the present invention; and FIG. 9 is a perspective view which illustrates the third embodiment of FIG. 8 when mounted on a fishing hook assembly to illustrate the dynamic properties thereof.

DETAILED DESCRIPTION OF THE PREFERRED EMBODIMENTS

Figure 1:
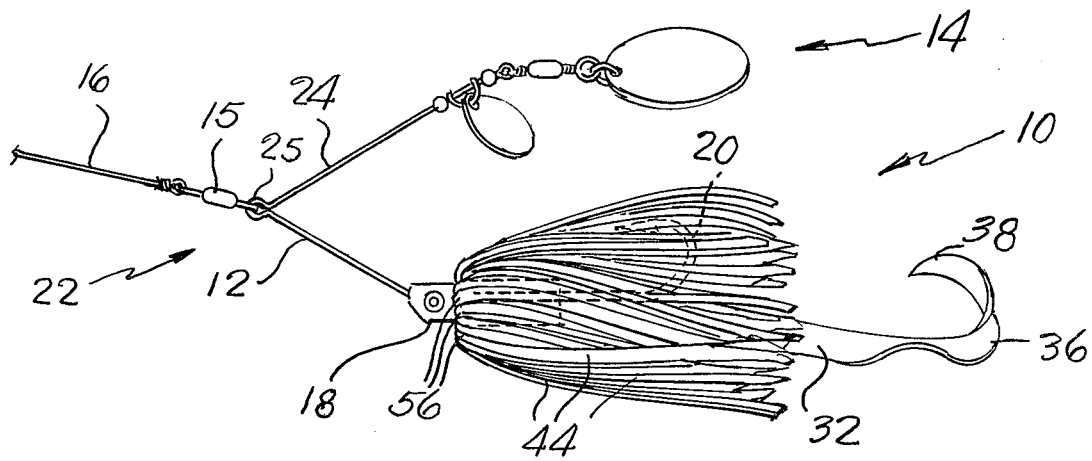
FIG. 1 is a side view illustrating one preferred embodiment of the present invention in combination with a standard fish hook assembly for illustrating the dynamic nature of the lure.

Referring now to the drawings, wherein like reference numerals indicate identical or corresponding parts throughout the several views, and more particularly to FIG. 1 thereof, there is illustrated in a side view one preferred embodiment of a fishing lure according to the present invention which is indicated generally by the reference numeral 10. The artificial fishing lure 10 of the present invention is illustrated in FIG. 1 in a typical dynamic state when mounted on a safety pin type of support assembly that is indicated generally by reference numeral 22.

Support 22 includes a pair of depending leg portions 12 and 24 to which are respectively connected a lure head 18 and a conventional spinner assembly indicated generally by the reference numeral 14. The lure head 18 may have an eye or other artificial enticing marking on the outer surface thereof, all of which is conventional. A curved hook 20 extends from the lure head 18 as illustrated and terminates in a standard barbed tip.

The support assembly 22 further includes a loop portion 25 connecting the legs 12 and 24. A swivel connector 15 or the like interconnects the loop portion 25 with a standard fishing line 16. The fishing lure 10 of the present invention may be mounted about the lure head 18 in any of a number of different configurations, the configuration depicted in FIG. 1 being a preferred one.

The particular construction of the components of the first preferred embodiment of the present invention will now be explained with reference to FIG. 3, which illustrates each of the major components of the inventive artifical fishing lure prior to assembly thereof. Reference numeral 30 indicates a curled tail member, reference numeral 40 refers to a skirt member, while reference numeral 50 indicates an optional auxiliary support member.

The curled tail member 30 is preferably comprised of a thin, flexible, flat piece of plastic or rubber-like material having planar parallel flat surfaces. Structurally, the tail member 30 includes an elongated body portion 32 which terminates at one end in a head or connecting portion 34. Extending integrally from the other end of elongated body portion 32 is a tail portion 36 which has curvilinear edges that preferably gradually taper down to the pointed tip 38. In the relaxed, static state illustrated in FIG. 2, tip 38 extends almost to the lower edge of the elongated body portion 32.

The curled tail member 30 is preferably comprised of a highly flexible material, such as latex rubber, or the like, and is preferably of a uniform thickness along its entire length. Presently, I have found that a thickness of 0.010 inches works quite satisfactorily, although it should be understood that the present invention contemplates any thickness within the range of about 0.004 to 0.020 inches. Further, the curled tail member 30 may be comprised of a rubberized vinyl or similar plastic material, in order to impart highly desirable durable properties thereto.

Figure 3:
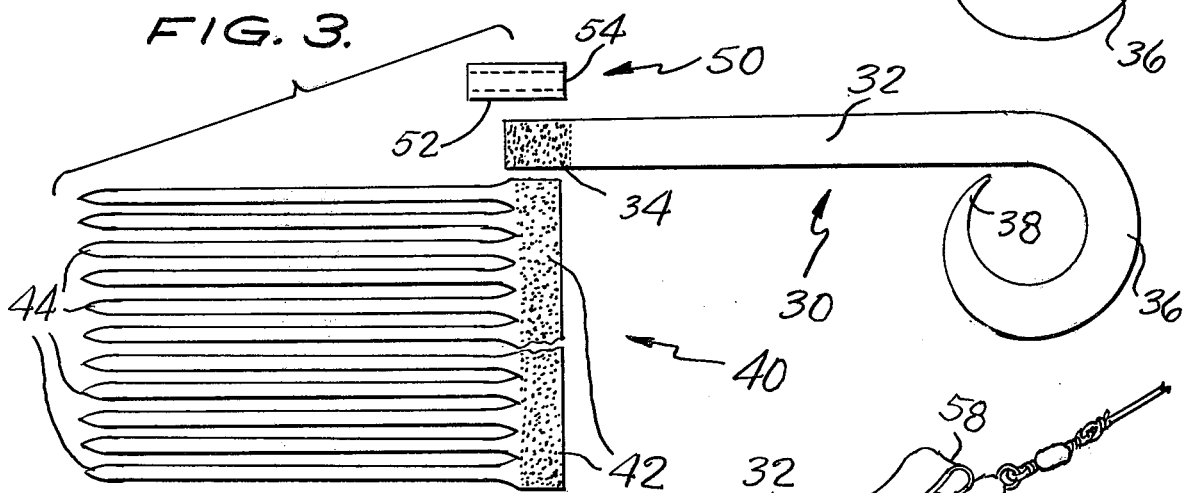
FIG. 3 is an exploded plan view, with parts broken away, which illustrates the basic components that may comprise the first preferred embodiment of the present invention illustrated in FIG. 2.

The skirt member 40 is comprised of a transverse collar portion 42 and a plurality of individual skirt strands 44 which extend, in the static state illustrated in FIG. 3, parallel from one edge of collar 42 from which they are preferably integrally formed. The skirt member 40 is also formed of a thin flat piece of a plastic or rubber-like material and, in fact, may be formed of a material identical to that from which the curled tail member 30 is constructed, such as rubberized vinyl, latex rubber, or the like. In a preferred mode, the skirt member 40 is constructed of rubberized vinyl and has a generally uniform thickness of approximately 0.007 inches, although it should be understood that the present invention contemplates any thickness within the general range of about 0.004 to 0.020 inches.

The support member 50, which is not essential to the finished product, comprises a sleeve or tubular support 52 which may also be made of rubber, plastic, or the like, but whose walls are substantially thicker and therefore more rigid than either of the members 30 or 40. The cylindrical support 52 has an aperture 54 formed centrally therethrough for mounting same about the shank portion of the hook assembly illustrated in FIG. 1. The diameter of aperture 54 should be sufficient so as to allow the lure 10 to be held snugly about the lure head 18 when mounted.

Figure 4:
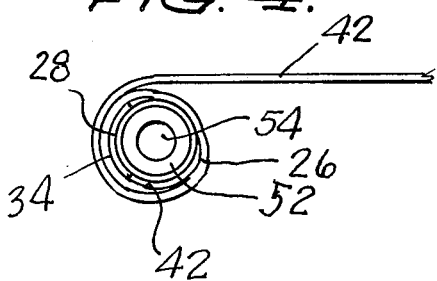
FIG. 4 is a cross-sectional view that shows the relative placement of the components of FIG. 3 during the assembly thereof.

In assembling the first preferred embodiment of the present invention, reference is made to FIG. 4 which illustrates an end view of the sleeve 52 against which a first end 26 of the collar portion 42 of skirt 40 has been initially adhesively attached. As the collar 42 is secured to sleeve 52 by wrapping it in one or more turns thereabout, (see numeral 28) the head 34 of curled tail member 30 is inserted and adhesively mounted between successive wraps. The wrapping process of collar 42 is then continued until the skirt 40 has been securely mounted to the sleeve 52 with the end or head portion 34 of the curled tail 30 being secured as described. The final product is illustrated in its static state in FIG. 2.

As an alternative to the utilization of support member 50, the head 34 of the curled tail 30 may be vulcanized between the wraps of the skirt 40. Other construction alternatives may suggest themselves to a skilled artisan.

Referring back to FIG. 1, the preferred embodiment artificial fishing lure 10 just described is illustrated in one possible mode of attachment to the fish hook assembly described hereinabove. In this mode, the sleeve 52 is placed about the lure head 18 (which surrounds the shank of hook 20) in such a fashion that, in the water, the strands 44 of the skirt 40 will be dynamically reverted or bent rearwardly as at 56 to trail from head 18 and surround the elongated body portion 32 of curled tail member 30. The latter element extends from the strands 44 at the approximate central portion thereof and provides a random undulating movement, substantially different from the movement provided by strands 44, in such a fashion so as to achieve excellent fish-attracting action. In this configuration, the strands 44 arch outwardly in a billowy extended stream by virtue of their being bent rearwardly (as at 56) from their normal direction of extension from collar 42. This billowy stream of strands also enhances the action of the lure. The length of curled tail member 30 may be selectively varied so as to make the member 30 shorter than, equal to, or longer than, the skirt strands 44 in the dynamic form of the invention when placed in use in the water.

Figure 2:
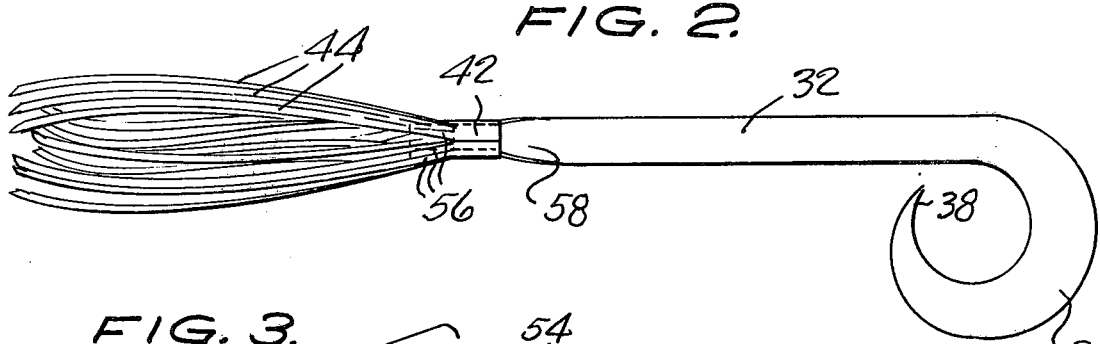
FIG. 2 is a plan view of the preferred embodiment fishing lure illustrated in FIG. 1 but without the associated fish hook assembly and in a static state.
Figure 5:
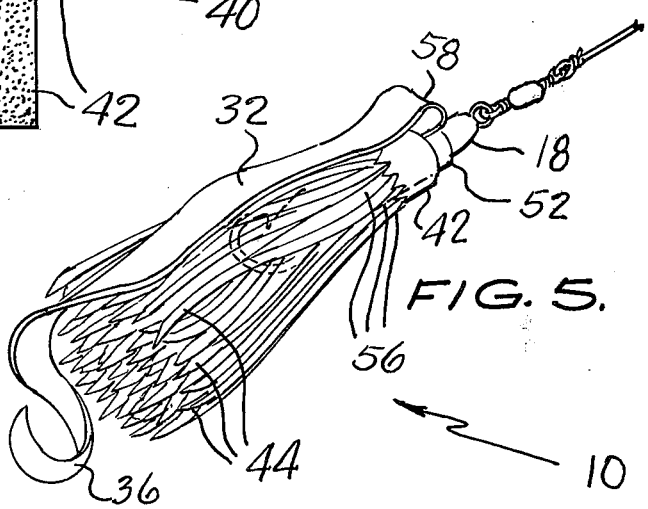
FIG. 5 is a perspective view illustrating an alternative mounting of the first preferred embodiment of the present invention on a fishing hook.

Referring now to FIG. 5, there is illustrated in a perspective view the same preferred embodiment of the fishing lure 10 as illustrated in FIG. 1, but mounted on a fish hook assembly in an alternative mode. In FIG. 5, the support member 50 is mounted on the shank of the hook in the reverse direction from that illustrated in FIG. 1. That is, the strands 44 of the skirt member 40 extend essentially straight back from the collar 42 about the hook such that the portions 56 thereof are not reverted as in FIG. 1. This results in a closer, more compact stream of strands in use. However, the tail member 30 will, in use, be reverted as at 58 so as to trail alongside strands 44 in the manner illustrated. This mode provides another and alternative unique type of action for the same embodiment of lure as illustrated in FIG. 2.

FIGS. 6 and 7 illustrate an alternative embodiment of the fishing lure to that set forth above with respect to FIGS. 1 through 5. In the embodiment illustrated in FIG. 6, the main components are identical to those utilized in connection with the first preferred embodiment. They are, however, assembled in such a fashion that the elongated body portion 32 of the curled tail 30 extends from the skirt collar 42 (its point of attachment) in the same direction as do the strands 44 thereof. In this manner, a lure having the typical dynamic state illustrated in FIG. 7 is realized, wherein the elongated portion 32 extends substantially concentrically from the central portion of the strands 44 and is normally surrounded by the strands which are, relative to the embodiment of FIG. 1, compact and close together in use.

FIG. 8 illustrates yet another and alternative embodiment of the present invention. In this embodiment, the curled tail 60 is double-ended and includes a central attachment portion 62. From central portion 62 extend a pair of oppositely directed elongated body portions 64 and 66, which are provided, respectively, with integrally formed curled tail portions 68 and 70. This embodiment may be constructed in the same manner described above in connection with the embodiments of FIGS. 3 and 6. This third embodiment, of course, differs in static form from the previous embodiments in that a portion 64 of the curled tail 60 will extend within the strands 44, while another portion 66 of the same member will extend forwardly of the collar 42. In use, this third embodiment will result in dynamic action such as illustrated in FIG. 9, wherein the elongated portion 64 extends within the strands 44, while the elongated portion 66 is bent rearwardly to normally trail alongside and outside of the strands 44. Of course, this embodiment as well as the other embodiments may be mounted with support member 50 facing either forwardly or rearwardly with respect to the lure head 18. This gives the user an option of how to use the invention depending upon fishing conditions.

It may be appreciated in light of the foregoing, that I have provided an extremely effective artificial fishing lure which is not only versatile but also very durable and, hence, reusable. The combination of the multi-strand skirt and the curled tail results in a synergistic effect in providing a degree of fish-attracting action which exceeds the effect available from each of the components if used separately.

Obviously, numerous variations and modifications of the present invention are possible in light of the above teachings. It is therefore to be understood that within the scope of the appended claims, the invention may be practiced otherwise than as specifically described herein.

What I claim as my invention:

1. A lure for attachment to a fish hook, which comprises skirt means having a plurality of skirt members, and curled tail means comprising a thin piece of flexible material having substantially planar parallel flat surfaces and including an elongated body portion and a curvilinear tail portion extending integrally from one end thereof, the other end of said elongated body portion of said piece of flexible material being connected to said skirt means.

2. The lure as set forth in claim 1, wherein said material comprises latex rubber.

3. The lure as set forth in claim 1, wherein the thickness of said flexible material ranges substantially between 0.004 inches and 0.020 inches.

4. The lure as set forth in claim 1, wherein said skirt means includes a collar from which integrally extend said plurality of skirt members.

5. The lure as set forth in claim 4, wherein said other end of said elongated body portion of said piece of flexible material is connected to said collar of said skirt means.

6. The lure as set forth in claim 5, wherein said skirt means comprises a second thin piece of flexible material.

7. The lure as set forth in claim 6, wherein said second thin piece of flexible material comprises rubberized vinyl.

8. The lure as set forth in claim 6, wherein the thickness of said second thin piece of flexible material ranges substantially between 0.004 inches and 0.020 inches.

9. The lure as set forth in claim 4, wherein said elongated body portion of said curled tail means extends from its point of connection to said skirt means in a direction substantially opposite to the direction of extension of said plurality of skirt members.

10. The lure as set forth in claim 4, wherein said elongated body portion of said curled tail means extends from its point of connection to said skirt means in substantially the same direction as that of the extension of said skirt members.

11. A lure for attachment to a fish hook, which comprises skirt means having a plurality of skirt members, and curled tail means comprising a thin piece of flexible material having substantially planar parallel flat surfaces and including an elongated body portion, a first curvilinear tail portion extending integrally from one end of said elongated body portion, and a second curvilinear tail portion extending integrally from the other end of said elongated body portion.

12. The lure as set forth in claim 11, wherein said skirt means includes a collar from which integrally extend said plurality of skirt members.

13. The lure as set forth in claim 12, wherein a midportion of said elongated body member is connected to said collar of said skirt means so as to define first and second elongated body portions extending in opposite directions from said collar.

14. The lure as set forth in claim 4, wherein said collar is wrapped about itself to form a plurality of concentric layers.

15. The lure as set forth in claim 14, wherein said other end of said elongated body portion is positioned between successive layers of said wrapped collar.

16. The lure as set forth in claim 15, further comprising a tubular support member about which said collar of said skirt means is wrapped.

17. The lure as set forth in claim 9, further in combination with a fish hook having a shank portion about which said collar is positioned such that in use said skirt members surround part of said elongated body portion of said curled tail means.

18. The lure as set forth in claim 9, further in combination with a fish hook having a shank portion about which said collar is positioned such that in use said elongated body portion of said curled tail means falls outside said plurality of skirt members.

19. The lure as set forth in claim 13, further in combination with a fish hook having a shank portion about which said collar is positioned such that in use part of said first elongated body portion is positioned within said plurality of skirt members, and part of said second elongated body portion is positioned outside of said plurality of skirt members.

20. The lure as set forth in claim 11, wherein said material comprises latex rubber.

21. The lure as set forth in claim 11, wherein the thickness of said flexible material ranges substantially between 0.004 inches and 0.020 inches.

22. A fishing lure which comprises skirt means comprising a flexible material and having a plurality of skirt members, and curled tail means comprising a thin piece of flexible material and including an elongated body portion and a curvilinear tail portion extending integrally from one end thereof, the other end of said elongated body portion of said thin piece of flexible material being connected to said skirt means.

23. The fishing lure as set forth in claim 22, further comprising a second curvilinear tail portion extending integrally from said elongated body portion of said thin piece of flexible material.

* * * * *